(12) United States Patent
Shirono

(10) Patent No.: US 8,964,049 B2
(45) Date of Patent: Feb. 24, 2015

(54) IMAGE-CAPTURING APPARATUS WITH ASYMMETRIC VIBRATION ELEMENT

(75) Inventor: Masahiro Shirono, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 524 days.

(21) Appl. No.: 13/253,162

(22) Filed: Oct. 5, 2011

(65) Prior Publication Data

US 2012/0113309 A1    May 10, 2012

(30) Foreign Application Priority Data

Nov. 10, 2010  (JP) .................................. 2010-252317
Nov. 10, 2010  (JP) .................................. 2010-252321
Jun. 10, 2011  (KR) ........................ 10-2011-0056335

(51) Int. Cl.
*H04N 5/228*   (2006.01)
*G02B 27/00*   (2006.01)
*H04N 5/217*   (2011.01)
*H04N 5/225*   (2006.01)

(52) U.S. Cl.
CPC .......... *G02B 27/0006* (2013.01); *H04N 5/2171* (2013.01)
USPC ........................ 348/208.99; 348/335; 348/374

(58) Field of Classification Search
CPC .......... H04N 5/23248; H04N 5/23251; H04N 5/145; H04N 5/23264; H04N 5/2253; H04N 5/2254; H04N 5/2257; H04N 5/2259
USPC ........................... 348/208.99, 208.4, 335, 374
See application file for complete search history.

(56) References Cited

U.S. PATENT DOCUMENTS

| | | | | |
|---|---|---|---|---|
| 7,778,536 B2 * | 8/2010 | Okamura | ........................ | 396/55 |
| 7,778,542 B2 * | 8/2010 | Oshima | ........................ | 396/236 |
| 8,289,617 B2 * | 10/2012 | Yamada et al. | ................ | 359/359 |
| 8,482,653 B2 * | 7/2013 | Yoshida | ........................ | 348/335 |
| 2004/0012714 A1 * | 1/2004 | Kawai | ........................... | 348/374 |
| 2004/0169761 A1 | 9/2004 | Kawai et al. | | |
| 2010/0165462 A1 | 7/2010 | Kawai et al. | | |
| 2010/0231780 A1 * | 9/2010 | Kawai | ........................... | 348/335 |
| 2010/0315712 A1 | 12/2010 | Kawai | | |

FOREIGN PATENT DOCUMENTS

| | | |
|---|---|---|
| JP | 2009-182828 A | 8/2009 |
| JP | 2010-119049 A | 5/2010 |
| JP | 2010-171934 A | 8/2010 |
| WO | WO 2008/093884 A1 | 8/2008 |

OTHER PUBLICATIONS

Search Report established for GB 1119279.6 (Mar. 2, 2012).
Office Action issued for JP 2010-252321 (Dec. 24, 2013).

* cited by examiner

*Primary Examiner* — Hung Lam
(74) *Attorney, Agent, or Firm* — Drinker Biddle & Reath LLP

(57) ABSTRACT

An image-capturing apparatus including an imaging device to convert light into an electrical signal; a vibration plate disposed in front of the imaging device to transmit the light to the imaging device; a vibration generating unit mounted on the vibration plate and to generate a vibration when a driving signal is input to the vibration generating unit; and a vibration partitioning unit mounted on at least one of the vibration plate or the vibration generating unit to asymmetrically deliver the generated vibration to the vibration plate.

9 Claims, 11 Drawing Sheets

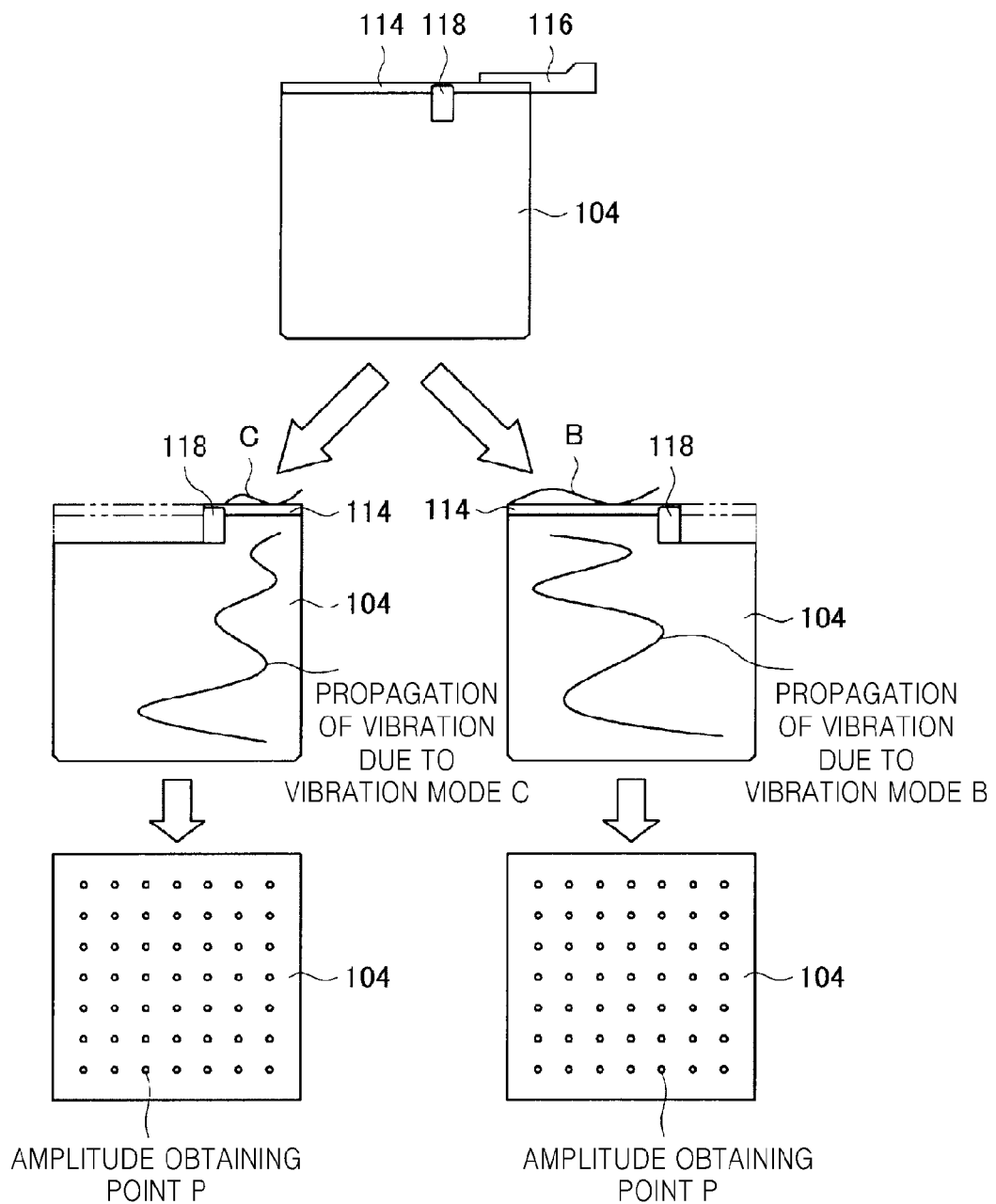

IMAGE-CAPTURING APPARATUS WITH ASYMMETRIC VIBRATION ELEMENT

CROSS-REFERENCE TO RELATED PATENT APPLICATIONS

This application claims the priority benefit of Japanese Patent Application No. 2010-252321, filed on Nov. 10, 2010 in the Japan Patent Office; Japanese Patent Application No. 2010-252317, filed on Nov. 10, 2010 in the Japan Patent Office; and Korean Patent Application No. 10-2011-0056335, filed on Jun. 10, 2011 in the Korean Intellectual Property Office, the disclosures of which are incorporated herein their entireties by reference.

BACKGROUND

1. Field of the Invention

The invention relates to an image-capturing apparatus, and more particularly, to an image-capturing apparatus capable of effectively removing dust by vibrating a vibration plate in a plurality of vibration modes.

2. Description of the Related Art

Recently, pixel pitch has been decreasing as the number of pixels implemented by imaging devices has increased. Dust stuck on an optical device near an image surface of an imaging device may be included in a captured image, and thus, may deteriorate image quality.

In order to solve this problem, U.S. Patent Publication No. 2004/0169761 describes a feature in which, with respect to one driving frequency input to an oscillator (a piezoelectric element), only one resonance mode that is effective for dust removal occurs in an optical device unit including the oscillator. When two or more driving frequencies are sequentially input to the oscillator to form complementary vibrations, two or more resonance modes that are effective for dust removal sequentially occur.

However, as described in U.S. Patent Publication No. 2004/0169761, when two or more driving signals of different frequencies are sequentially input to the oscillator a vibration node exists for each frequency, although positions of the vibration nodes vary according to frequencies of the driving signals. Because the vibration amplitude is 0 at the vibration nodes, although the frequencies vary, the efficiency of dust removal deteriorates at the position of the vibration node for each frequency.

Also, according to U.S. Patent Publication No. 2004/0169761, it is necessary to input two or more driving signals of different frequencies to the oscillator. However, this increases manufacturing costs due to a more complicated driving circuit.

Japanese Patent Publication No. 2010-119049 describes simultaneous input of two driving signals of different frequencies to respective vibration members, creating two different resonance modes that are simultaneously effective for dust removal.

However, according to Japanese Patent Publication No. 2010-119049, because it is necessary to separately form the two vibration members that operate at different frequencies, device configuration becomes more complicated, the number of parts increases, and the number of manufacturing processes increases resulting in an increase manufacturing costs. Also, due to the use of two vibration members, it is necessary to arrange a relatively large space in an apparatus, which may make it difficult to reduce the size of the apparatus.

SUMMARY

The invention provides an image-capturing apparatus capable of effectively removing dust using a simple configuration to prevent a position of a vibration node from being fixed when dust is removed by vibrating a vibration plate.

According to an aspect of the invention, there is provided an image-capturing apparatus including an imaging device to convert light into an electrical signal; a vibration plate disposed in front of the imaging device to transmit the image light to the imaging device; a vibration generating unit mounted on the vibration plate to generate a vibration when a driving signal is input to the vibration generating unit; and a vibration partitioning unit mounted on at least one of the vibration plate or the vibration generating unit to asymmetrically deliver the generated vibration to the vibration plate.

In the image-capturing apparatus, the vibration partitioning unit may divide and may deliver the vibration, whereby vibrations due to different modes may be delivered to the vibration plate, vibration nodes may be reduced to a minimum level, and thus a dust removal function may be improved.

The driving signal input to the vibration generating unit may consist of only one frequency.

The vibration generating unit may be mounted on an end of the vibration plate, and the vibration partitioning unit may include a vibration suppression plate connected to the vibration generating unit, is positioned at a position deviating from a center line passing through a central portion of the vibration plate, and is to suppress the vibration of the vibration generating unit.

One end of the vibration suppression plate may be connected to the vibration generating unit and the other end of the vibration suppression plate may be connected to the vibration plate. The vibration suppression plate may suppress the vibration of the vibration generating unit and may divide the vibration delivered to the vibration plate.

The vibration generating unit may include a piezoelectric device, and a first electrode and a second electrode that are disposed to face each at opposite sides of the piezoelectric device and apply the driving signal to the piezoelectric device, and the vibration partitioning unit may be a region that does not vibrate the piezoelectric device so that a portion of the first electrode is arranged to deviate from a position facing the second electrode. Because a vibration is not generated in the vibration partitioning unit that is implemented by the portion of the first electrode and that does not vibrate the piezoelectric device, the vibration of the vibration generating unit is suppressed, thereby being possible to divide the vibration delivered to the vibration plate.

The vibration generating unit may be mounted on an end of the vibration plate, and the vibration partitioning unit may include a cut part formed by removing a portion of the vibration plate contacting the vibration generating unit.

When the vibration generated by the vibration generating unit is delivered to the vibration plate, the vibration is divided by the cut part and then is delivered, thereby being possible to generate vibrations due to the different modes in both sides of the vibration plate with respect to the cut part. That is, the vibrations due to the different modes may propagate to a surface of the vibration plate, thereby suppressing vibration nodes to a minimum level, and thus, a dust removal function may be improved.

The cut part may be formed at a position deviating from a center line passing through a central portion of the vibration plate.

The vibration plate may have an asymmetrical shape with respect to the center line passing through the central portion of the vibration plate. Due to the asymmetrical shape of the vibration plate, a vibration propagation due to the different modes may intensively occur in both sides of the cut part.

The image-capturing apparatus may further include a vibration suppression plate disposed on the vibration plate at a position opposite the cut part with respect to the center line passing through the central portion of the vibration plate. Accordingly, the vibration propagation due to the different modes may intensively occur in both sides of the cut part.

BRIEF DESCRIPTION OF THE DRAWINGS

The above and other features and advantages of the invention will become more apparent by describing in detail exemplary embodiments thereof with reference to the attached drawings in which:

FIG. 5 is a diagram describing vibration modes in which vibrations generated in a second region and a third region of the vibration generating unit of FIG. 4 propagate to the vibration plate;

DETAILED DESCRIPTION

Hereinafter, the invention will be described in detail by explaining exemplary embodiments of the invention with reference to the attached drawings.

Figure 1:
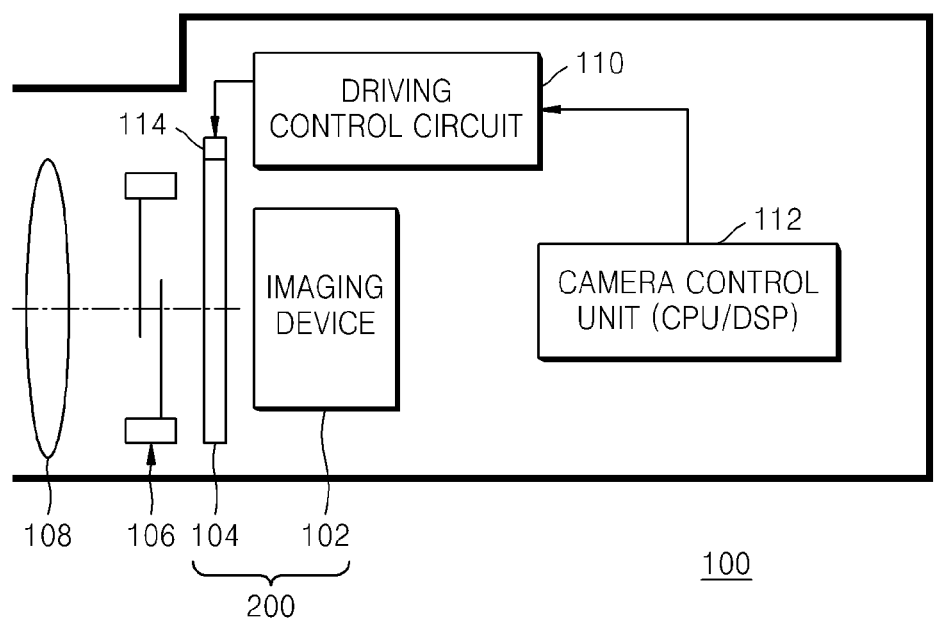
FIG. 1 is a block diagram illustrating a configuration of an image-capturing apparatus, according to an embodiment of the invention.

FIG. 1 is a block diagram illustrating a configuration of an image-capturing apparatus 100, according to an embodiment of the invention.

The image-capturing apparatus 100 includes an imaging device 102, a vibration plate 104, a vibration generating unit 114, and a vibration partitioning unit. Although the vibration partitioning unit is not illustrated in FIG. 1, vibration partitioning units are discussed below in connection with in FIGS. 4, 5, 6A, 6B, 7, 8A, 8B, and 9-12.

A shutter unit 106 and an imaging optical system 108 may be disposed in front of the imaging device 102. Also, the image-capturing apparatus 100 may include a driving control circuit 110 for controlling driving of the vibration plate 104, and a camera control unit 112 such as a central processing unit (CPU) and/or digital signal processor (DSP).

The imaging device 102 functions to capture image light representing a target object and to convert the image light into an electrical signal. The imaging device 102 may be formed of a photoelectric conversion device including a charge coupled device (CCD), a complementary metal oxide semiconductor (CMOS), or the like. An image of the target object is formed on an imaging surface of the imaging device 102 by the imaging optical system 108. The image-capturing apparatus 100 sends a driving signal having a predetermined frequency to the vibration generating unit 114 via the driving control circuit 110. The vibration generating unit 114 is a vibration source for the vibration plate 104. The image-capturing apparatus 100 removes dust stuck to the vibration plate 104 by vibrating the vibration plate 104 that is disposed in front of the imaging device 102.

In the present embodiment, the vibration generating unit 114 may be a piezoelectric device. Recently, in order to move a lens of an optical system, a piezoelectric device that operates due to a piezoelectric effect is widely used. Using the piezoelectric device, it is possible to manufacture a very small driving motor. The piezoelectric device may be a stack-type piezoelectric device formed by stacking a plurality of electrodes, or may be a piezoelectric device having a single layer which when an alternating current is applied thereto, generates a vibration according to a driving waveform of the applied alternating current. However, the present embodiment is not limited to the aforementioned configuration of the vibration generating unit 114, and thus, other than the piezoelectric device, different types of configuring elements capable of generating a vibration according to an applied driving signal may be used.

The imaging device 102 and the vibration plate 104 are assembled to form an imaging device unit 200, and a space between the imaging surface of the imaging device 102 and the vibration plate 104 may be sealed. Thus, it is possible to prevent dust from becoming stuck to the imaging surface of the imaging device 102, and simultaneously, to remove dust stuck to the vibration plate 104, so that it is possible to prevent dust from degrading images formed on the imaging surface.

Figure 2:
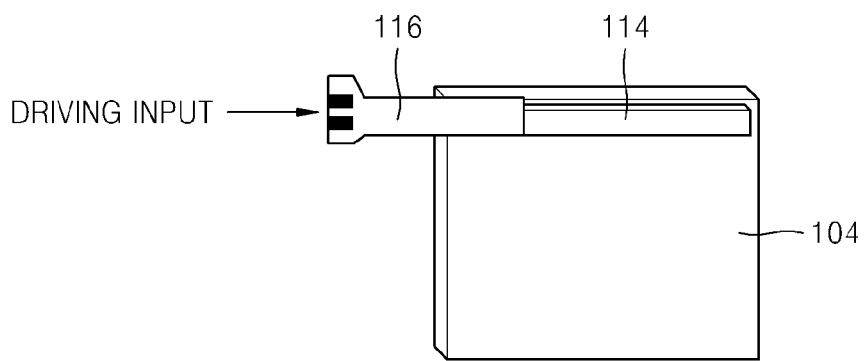
FIG. 2 is a perspective view illustrating configurations of a vibration plate and a vibration generating unit illustrated in FIG. 1, according to an embodiment of the invention.

FIG. 2 is a perspective view illustrating configurations of the vibration plate 104 and the vibration generating unit 114 illustrated in FIG. 1.

The vibration generating unit 114 is mounted on an upper end of the vibration plate 104. A flexible circuit board (FPC) 116 is connected to the vibration generating unit 114 so as to input the driving signal applied from the driving control circuit 110.

The vibration plate 104 includes an optical element that transmits light passing through the imaging optical system 108, and in the present embodiment, the vibration plate 104 is formed as a low pass filter (LPF). However, the present embodiment is not limited to the optical element used as the vibration plate 104, and thus a glass plate, or a lens for changing a travel path of light may be used as the vibration plate 104.

When the vibration generating unit 114 vibrates, a vibration capable of removing dust stuck to the vibration plate 104 is generated. Because a vibration displacement of the vibration generating unit 114 that is the vibration source may be very small, by forming resonance modes as illustrated in FIGS. 3A and 3B, it is possible to generate the vibration capable of effectively removing the dust from the vibration plate 104.

Figure 3A:
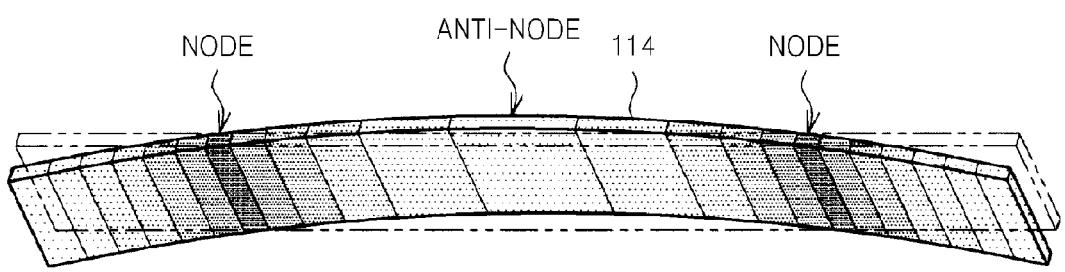
FIG. 3A illustrates a resonance mode of the vibration generating unit, where one anti-node and two nodes are generated.
Figure 3B:
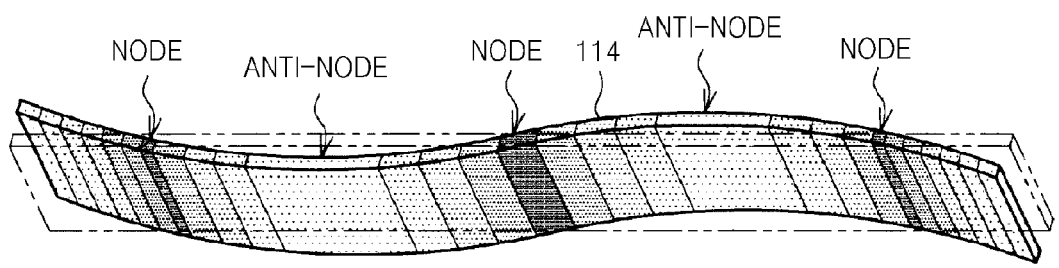
FIG. 3B illustrates a resonance mode of the vibration generating unit, where two anti-nodes and three nodes are generated.

FIG. 3A illustrates a resonance mode of the vibration generating unit 114, where one anti-node and two nodes are generated, and FIG. 3B illustrates a resonance mode of the vibration generating unit 114, where two anti-nodes and three nodes are generated.

FIG. 3A corresponds to a case in which a vibration is generated in the resonance mode where the two nodes and the anti-node are generated in the vibration generating unit 114. FIG. 3B corresponds to a case in which a vibration is generated in the resonance mode where the three nodes and the two anti-nodes are generated in the vibration generating unit 114. Compared to the case of FIG. 3A, the case of FIG. 3B corresponds to a situation in which a frequency of a signal input to the vibration generating unit 114 is higher.

As illustrated in FIGS. 3A and 3B, an anti-node portion and a node portion are generated in the vibration generated in the resonance mode. Because vibration amplitude is great in the anti-node portion, stuck dust may be efficiently removed. However, because the vibration amplitude at the node portion is 0, stuck dust may not be effectively removed.

The image-capturing apparatus 100 according to the present embodiment substantially generates two simultaneous resonance modes by employing a vibration partitioning unit that partitions a vibration into two vibrations, so that a node is not generated anywhere in an entire region of the vibration plate 104, and the vibration propagates on the vibration plate 104 when the vibration generating unit 114 is driven at a predetermined frequency. Thus, it is possible to vibrate substantially the entire region of the vibration plate 104 all the time, and to simultaneously vibrate the vibration generating unit 114 using a driving signal having a predetermined frequency, so that the dust stuck to the vibration plate 104 may be surely or effectively removed.

Figure 4:
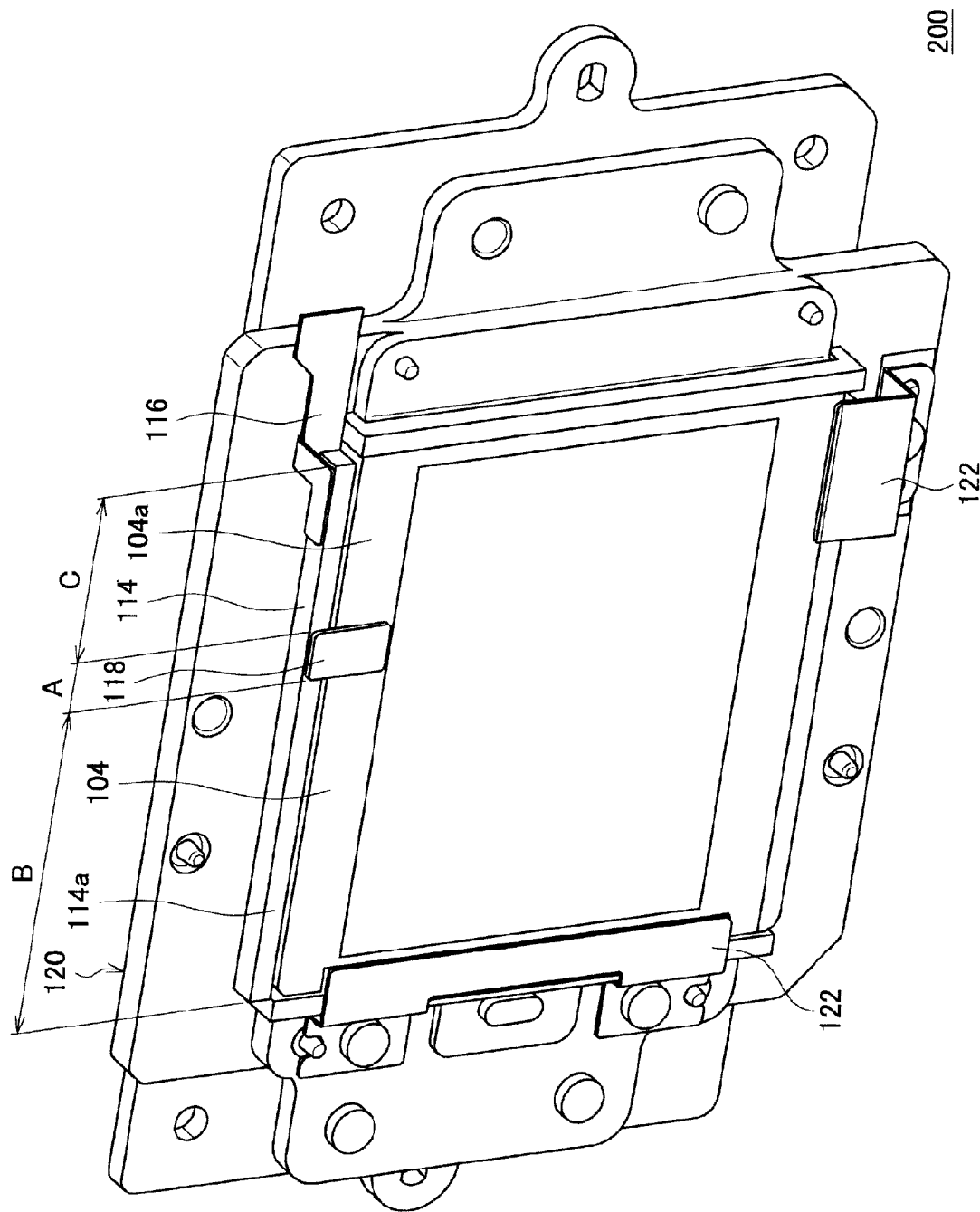
FIG. 4 is a perspective view of an imaging device unit mounted in the image-capturing apparatus of FIG. 1, according to an embodiment of the invention.

FIG. 4 is a perspective view of the imaging device unit 200 mounted in the image-capturing apparatus 100 of FIG. 1.

The imaging device unit 200 includes a supporting frame 120 and a supporting plate 122. The vibration plate 104 is mounted on the supporting frame 120 and is supported in order to vibrate by interposing a cushion (not shown) between the supporting frame 120 and the supporting plate 122. A driving signal having a predetermined frequency and sent from the driving control circuit 110 is input to the vibration generating unit 114 via the FPC 116.

The vibration generating unit 114 is mounted on the upper end of the vibration plate 104 (in the orientation illustrated in FIG. 4). The vibration generating unit 114 extends along the upper end of the vibration plate 104 and is adhered to an almost entire edge of the upper end of the vibration plate 104. The vibration generating unit 114 may be adhered to the vibration plate 104 using an ultraviolet-curable adhesive. The FPC 116 is connected to the vibration generating unit 114.

In FIG. 4, a surface 114a of the vibration generating unit 114, and a surface 104a of the vibration plate 104 are formed to be a substantially flat or planar surface. Also, a vibration suppression plate 118 is mounted to partly cover the surface 114a and the surface 104a by extending over a boundary between the vibration generating unit 114 and the vibration plate 104. The vibration suppression plate 118 may be adhered to both the surface 114a of the vibration generating unit 114 and the surface 104a of the vibration plate 104 using an ultraviolet-curable adhesive.

The vibration suppression plate 118 is an example of the vibration partitioning unit, and the vibration partitioning unit is not limited to the example of FIG. 4. The vibration suppression plate 118 is mounted on at least one of the vibration plate 104 and the vibration generating unit 114, and allows the vibration generated in the vibration generating unit 114 to be asymmetrically delivered to the vibration plate 104. Thus, in another example of FIG. 4, the vibration suppression plate 118 may be mounted only on the vibration generating unit 114 or may be mounted only on the vibration plate 104.

The vibration suppression plate 118 is formed of a material having an anti-vibration characteristic, compared to the vibration plate 104 and the vibration generating unit 114.

A physical quantity to describe the anti-vibration characteristic of the vibration suppression plate 118 may be the density or Young's modulus (i.e., the Young's tensile modulus).

For example, the vibration suppression plate 118 may be formed of a material including stainless steel, plastic, or hard rubber, which have a great rigidity, so that the vibration suppression plate 118 may have a Young's modulus sufficiently greater than that of the vibration generating unit 114.

Thus, in a first region A of the vibration generating unit 114 in which the vibration suppression plate 118 is adhered, a vibration is suppressed, compared to a second region B or a third region C, which are other regions of the vibration generating unit 114. Vibrations due to a contraction movement and an expansion movement of the vibration generating unit 114 at a position where the vibration suppression plate 118 is mounted are divided and then are delivered to the vibration plate 104, so that two different vibration modes are generated in both sides or portions of the vibration plate 104 with respect to the first region A where the vibration suppression plate 118 is adhered.

The first region A of the vibration generating unit 114 in which the vibration suppression plate 118 is adhered is a vibration-insensitive region (a vibration suppression region) in which vibration is suppressed. The vibration generating unit 114 in the second region B and the third region C on opposite sides of the first region A vibrates due to a driving signal having a predetermined frequency and supplied from the FPC 116.

Thus, the second region B and the third region C of the vibration generating unit 114, which are divided by the first region A, independently vibrate, and both vibrations from the second region B and the third region C propagate into the vibration plate 104, so that the vibration generating unit 114 and the vibration plate 104 vibrate together.

FIG. 5 is a diagram describing vibration modes in which vibrations generated in the second region B and the third region C of the vibration generating unit 114 of FIG. 4 propagate into the vibration plate 104.

As illustrated in a middle part of FIG. 5, vibration is suppressed in the first region A where the vibration suppression plate 118 is adhered, so that vibrations having different vibration modes propagate from the second region B and the third region C, respectively. Here, the vibration mode of the second region B is referred to as a vibration mode B, and the vibration mode of the third region C is referred to as a vibration mode C. Thus, although a driving signal applied to the vibration generating unit 114 has a predetermined single frequency; it is possible to obtain an effect as if the vibration generating unit 114 vibrates due to two different applied frequencies.

The vibration due to the vibration mode B and the vibration due to the vibration mode C are combined at each position at a surface of the vibration plate 104, so that a displacement occurs. When examining a random point at the surface of the vibration plate 104, although a node is generated at the examined point due to the vibration propagated from the vibration mode C so that the vibration amplitude decreases, a node is not generated due to the vibration generated from the vibration mode B.

In this manner, because the vibrations due to the vibration mode B and the vibration mode C propagate together, the decrease of the vibration amplitude at a node position may be offset by a vibration due to another vibration mode, so that the number of nodes generated in the vibration plate 104 may be substantially reduced. Thus, the number of nodes at which displacement is 0 may be substantially reduced across an entire region of the vibration plate 104.

Here, a node position at the surface of the vibration plate 104 in each vibration mode varies according to a frequency of an input signal, so that, when the frequency is appropriately selected, it is possible to decrease the occurrence of a portion where amplitude (displacement) locally decreases on a surface of the vibration generating unit 114.

A plurality of points at the surface of the vibration plate 104, as illustrated in a lower part of FIG. 5, indicate amplitude obtaining points for obtaining amplitude (displacement) of a vibration when the vibration due to each of the vibration mode B and the vibration mode C is simulated using frequency response analysis. Here, as an example, 7×7=49 amplitude obtaining points are matrix-set on the vibration plate 104. An actual amplitude may be measured at the amplitude obtaining points.

In order to avoid an amplitude node from being generated in substantially the entire region of the vibration plate 104, a frequency of a driving signal applied from the FPC 116 to the vibration plate 104 is appropriately selected. By varying a frequency of the driving signal input from the FPC 116 to the vibration generating unit 114, it is possible to identify a frequency at which a vibration amplitude that is equal to or greater than a predetermined value is obtained at each of the amplitude obtaining points with respect to each of the vibration mode B and the vibration mode C.

Figure 6A:
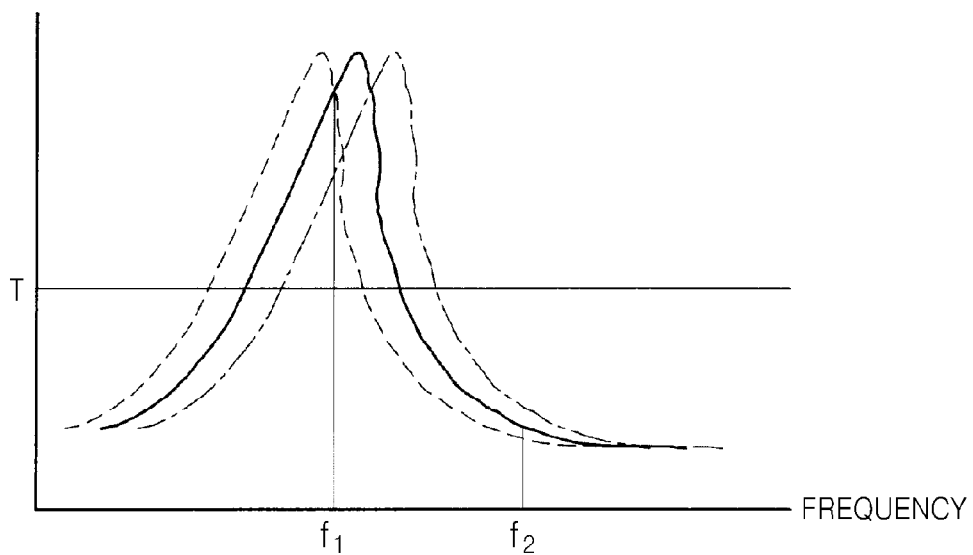
FIG. 6A is a graph showing a relationship between a frequency and amplitude (displacement) of a vibration generated at a specific point of a vibration plate due to the vibration mode.
Figure 6B:
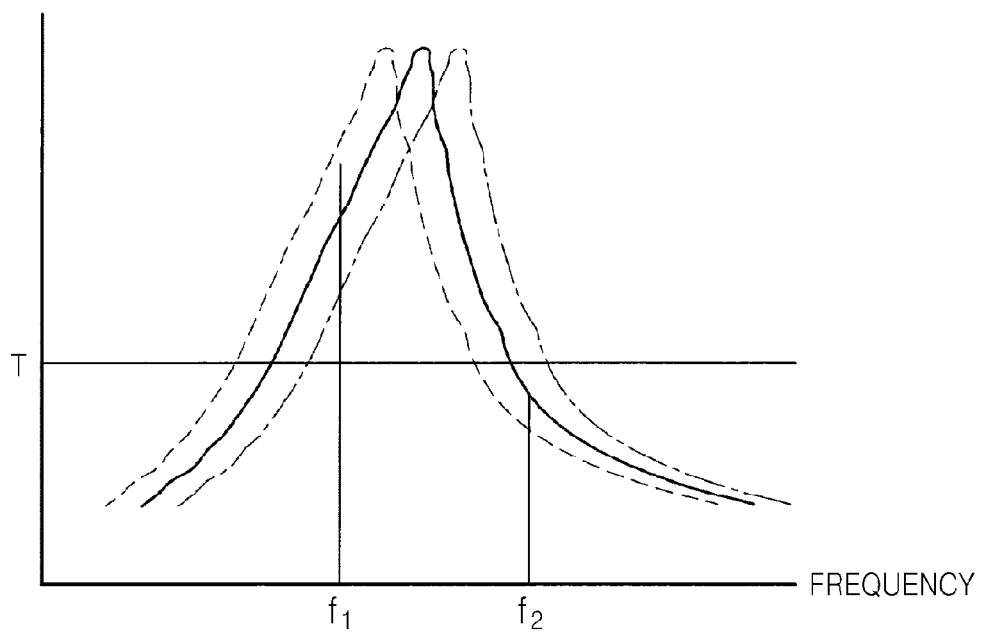
FIG. 6B is a graph showing a relationship between a frequency and amplitude (displacement) of a vibration generated at a specific point of a vibration plate due to the vibration mode.

FIG. 6A is a graph showing a relationship between a frequency and an amplitude (displacement) of a vibration generated at a specific point of a vibration plate due to the vibration mode B. FIG. 6B is a graph showing a relationship between a frequency and amplitude (displacement) of a vibration generated at a specific point at a vibration plate due to the vibration mode C.

FIGS. 6A and 6B illustrate simulation results obtained by frequency response analysis. Here, FIG. 6A illustrates a characteristic according to the vibration mode B, and FIG. 6B illustrates a characteristic according to the vibration mode C. In FIGS. 6A and 6B, a vertical axis indicates the vibration amplitude, and a horizontal axis indicates the applied driving frequency.

When the frequency varies as illustrated in FIGS. 6A and 6B, the amplitude varies according to the variation of the frequency. When a position of an amplitude obtaining point P in FIGS. 5A and 5B approaches a node position of the vibration according to the variation of the frequency, the amplitude decreases.

As illustrated in FIG. 6A, for the vibration mode B and a frequency f1, the amplitude approaches a maximum value. Also, in a case of the vibration mode C and the frequency f1, the amplitude is greater than a predetermined threshold value T. Thus, it is possible to generate a vibration having a relatively large amplitude in both the vibration mode B and the vibration mode C at the amplitude obtaining point P.

In a case of a frequency f2, the amplitude becomes smaller than the predetermined threshold value T in both the vibration mode B and the vibration mode C. Thus, when the driving signal has the frequency f2, it may not be possible to generate a vibration having sufficient amplitude at the amplitude obtaining point P. Therefore, according to the simulation results at the amplitude obtaining point P, use of the driving signal having the frequency f1 may be preferable over the frequency f2.

By performing the aforementioned simulation at each amplitude obtaining point, a frequency f0 may be obtained which is not in the range of the frequency f2 in FIGS. 6A and 6B, and in this case, an amplitude in both the vibration mode B and the vibration mode C at all amplitude obtaining points is equal to or greater than the predetermined threshold value T. When the vibration generating unit 114 is driven at the frequency f0, sufficient amplitude is obtained at each of the amplitude obtaining points, so that dust stuck substantially anywhere on an entire surface region of the vibration plate 104 may be effectively removed. In this regard, the number of the amplitude obtaining points is not limited, and may appropriately vary.

Also, by varying the position (i.e., a length of two side ends of the first region A of the vibration generating unit 114) where the vibration suppression plate 118 is mounted, a displacement characteristic with respect to frequency may be changed as shown in FIGS. 6A and 6B. Thus, when frequency varies in the aforementioned simulation, if necessary, a simulation with respect to the position of the vibration suppression plate 118 may be simultaneously or sequentially performed, so that it is possible to obtain or identify the frequency f0 at which a sufficient amplitude is obtained at all amplitude obtaining points.

As illustrated in FIG. 5, the vibration suppression plate 118 may be connected to the vibration generating unit 114 at a position that deviates (e.g., different) from a center line of the vibration plate 104. When the position of the vibration suppression plate 118 approaches an end of the vibration generating unit 114, an amplitude of a vibration in one of the vibration mode B and the vibration mode C may decrease. However, when the vibration suppression plate 118 is disposed at a region adjacent to or near the center line of the vibration plate 104, amplitudes due to the vibration mode B and the vibration mode C may increase together. Because amplitude at each of the amplitude obtaining points varies according to an input frequency, a position for the vibration suppression plate 118 may be set or selected by performing the method described above with reference to FIGS. 6A and 6B.

As described above, when a frequency is selected so that an amplitude at each of the amplitude obtaining points is equal to or less than a predetermined value in both of the vibration mode B and the vibration mode C, and the length of the first region A is adjusted according to necessity, a vibration having a sufficient amplitude may be generated across substantially the entire region of the vibration plate 104, so that dust stuck substantially anywhere to the surface of the vibration plate 104 may be effectively removed.

Thus, the number of nodes of a vibration generated in the surface of the vibration plate 104 may be substantially reduced without changing a driving frequency of the vibration generating unit 114, so that an amount of effective dust removal time achievable with respect to a driving time may be increased. Therefore, a function for removal of dust stuck to the vibration plate 104 is significantly improved and a circuit configuration for a change of a driving frequency is not necessary, so that a configuration of the image-capturing apparatus 100 may be simplified, and thus manufacturing costs may be significantly reduced. Also, only one vibration generating unit 114 is needed, so that, compared to a configuration having two vibration sources (vibration generating units) and a driving circuit, manufacturing costs may be significantly reduced and size of the image-capturing apparatus 100 may be reduced.

As described above, according to the present embodiment, a vibration from vibration generating unit 114 is divided by adhering the vibration suppression plate 118 to a portion of the vibration generating unit 114, and then is delivered to the vibration plate 104, so that a plurality of vibration modes may be generated in response to an input frequency of the driving signal. Also, a frequency is selected so that the amplitude at each of the amplitude obtaining points set in the vibration plate 104 is equal to or greater than the predetermined value that is necessary for effective removal of dust, and thus, the dust from substantially the entire region of the vibration plate 104 may be effectively removed.

Figure 7:
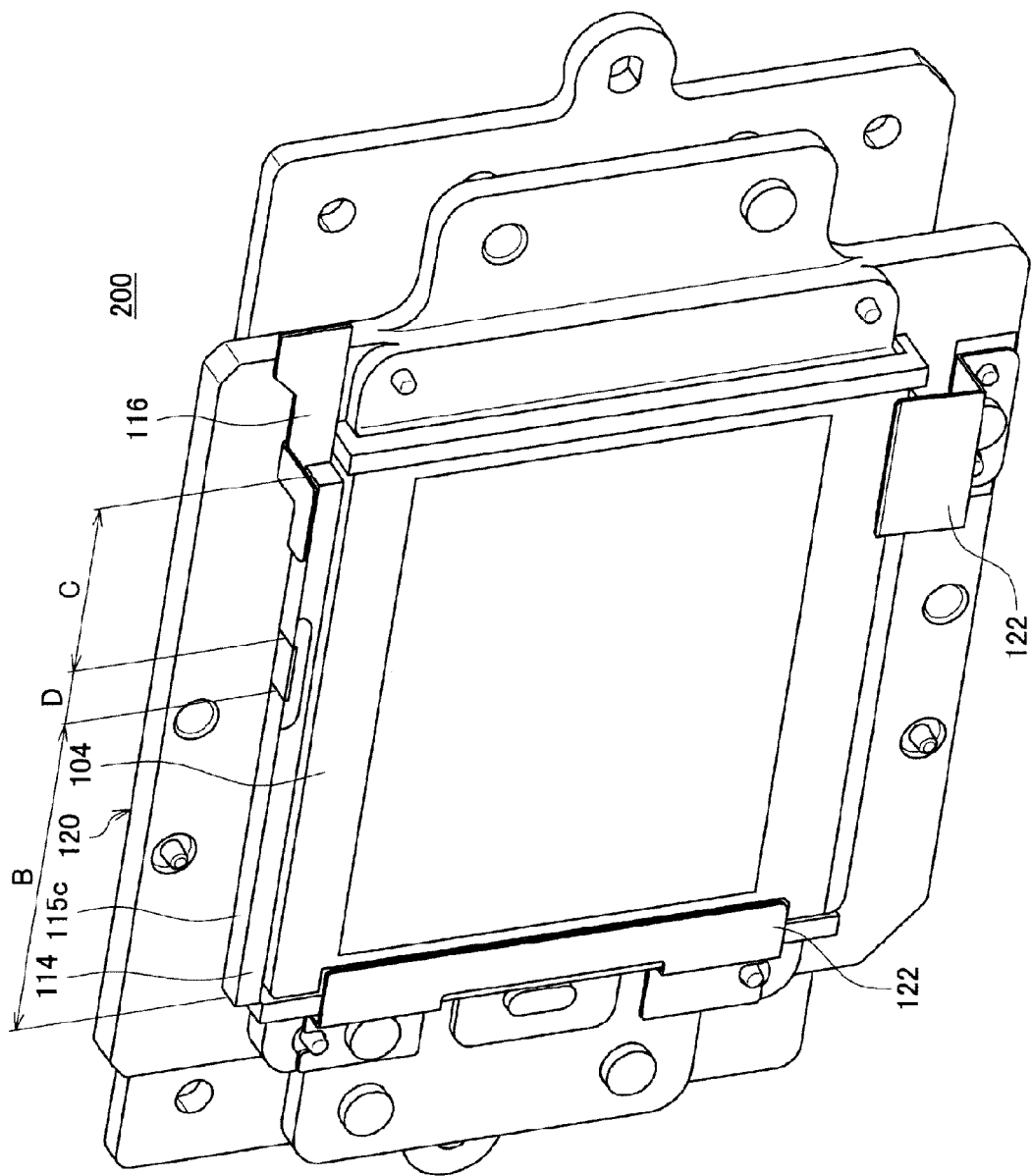
FIG. 7 is a perspective view of an imaging device unit mounted in an image-capturing apparatus, according to another embodiment of the invention.

FIG. 7 is a perspective view of an imaging device unit mounted in an image-capturing apparatus according to another embodiment of the invention.

In the previous embodiment, a vibration from the vibration generating unit 114 is divided by adhering the vibration suppression plate 118 to the vibration generating unit 114, and then delivered to the vibration plate 104. In the present embodiment, a vibration partitioning unit is implemented by forming a region in which a vibration is not generated due to the fact that an electrode is not arranged on a top surface of the vibration generating unit 114, so that a vibration from the vibration generating unit 114 is divided and then is delivered to the vibration plate 104.

As illustrated in FIG. 7, a first electrode 115c is placed on the top surface of the vibration generating unit 114 so as to apply a frequency to the vibration generating unit 114. Also, a block region D in which the first electrode 115c is not formed is arranged in a region adjacent to a central portion in a longitudinal direction of the vibration generating unit 114. The block region D is an example of the vibration partitioning unit, and is implemented by placing the first electrode 115c to be positioned on a side surface of the vibration generating unit 114. In the block region D, a voltage is not applied in a vertical direction of the vibration generating unit 114, so that no vibration is generated.

Figure 8A:
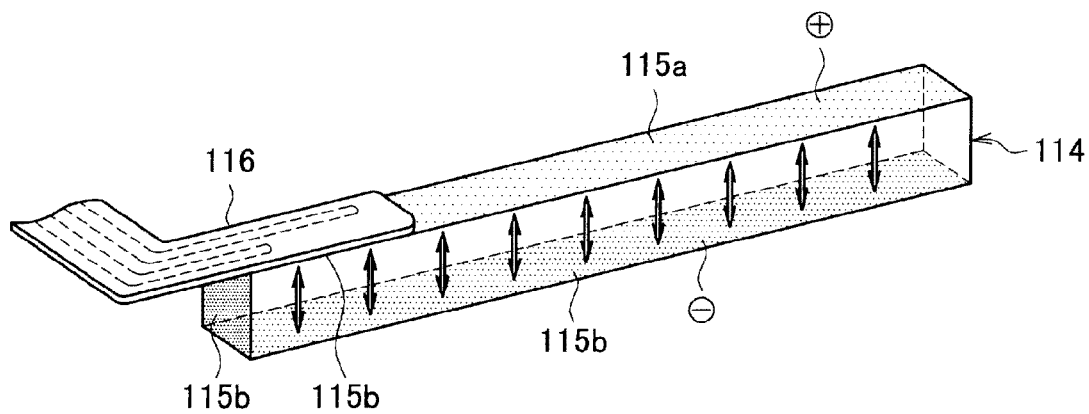
FIG. 8A is a perspective view illustrating the vibration generating unit in the embodiment of FIG. 4 and an arrangement of electrodes.
Figure 8B:
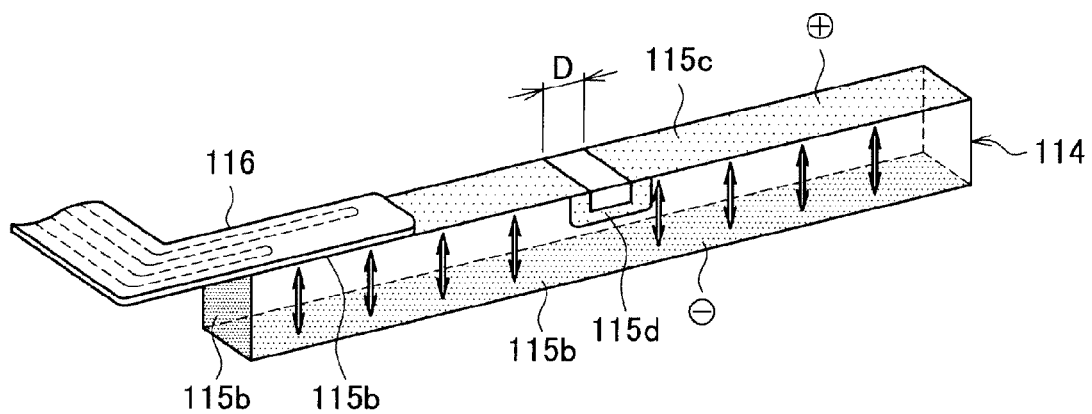
FIG. 8B is a perspective view illustrating the vibration generating unit in the embodiment of FIG. 7 and an arrangement of electrodes.

FIG. 8A is a perspective view illustrating the vibration generating unit 114 in the embodiment of FIG. 4 and arrangement of electrodes. FIG. 8B is a perspective view illustrating the vibration generating unit 114 in the embodiment of FIG. 7 and arrangement of electrodes.

FIGS. 8A and 8B particularly illustrate the vibration generating unit 114 and the arrangement of electrodes 115a through 115d. Here, FIG. 8A illustrates the arrangement of the electrodes 115a and 115b in the vibration generating unit 114 of the embodiment of FIG. 4.

As illustrated in FIG. 8A, the first electrode 115a that is a positive (+) electrode is disposed on a top surface of the vibration generating unit 114, and the second electrode 115b that is a negative (−) electrode is disposed on a bottom surface of the vibration generating unit 114. The second electrode 115b that is disposed on the bottom surface of the vibration generating unit 114 extends along a longitudinal end part of the vibration generating unit 114 toward the top surface of the vibration generating unit 114. A gap is formed between the first electrode 115a and the second electrode 115b on the top surface of the vibration generating unit 114.

The FPC 116 is adhered to the top surface of the vibration generating unit 114 and is connected to each of the first electrode 115a and the second electrode 115b. According to this configuration, an input signal from the FPC 116 is applied to each of the first electrode 115a and the second electrode 115b, so that a contraction occurs in a vertical direction (an arrow direction in FIG. 8A) in the vibration generating unit 114. As a result, a contraction force is generated in the vertical direction of the vibration generating unit 114, so that a vibration as described above with reference to FIGS. 3A and 3B may be generated.

FIG. 8B illustrates the arrangement of the electrodes 115b through 115d in the vibration generating unit 114 of the embodiment of FIG. 7. A configuration of the second electrode 115b is the same as in FIG. 8A. The first electrode 115c is disposed on a top surface of the vibration generating unit 114. Although a basic configuration of the first electrode 115c is the same as that of the first electrode 115a of FIG. 8A, both sides of the first electrode 115c are connected to each other with respect to a block region D by a detour part 115d embedded in a side surface of the vibration generating unit 114, so that the first electrode 115c deviates from the block region D of the top surface of the vibration generating unit 114, wherein the block region D faces the second electrode 115b.

According to this configuration, when an input signal from the FPC 116 is applied to each of the first electrode 115c and the second electrode 115b, a contraction occurs in regions other than the block region D in a vertical direction (an arrow direction in FIG. 8B) of the vibration generating unit 114, but, because a voltage is not applied to the block region D, the contraction does not occur in the block region D. Thus, the block region D may divide a vibration of the vibration generating unit 114 and may deliver the divided vibrations to the vibration plate 104, so that different vibration modes B and C may be generated in a second region B and a third region C at both sides of the block region D, as in the embodiment of FIG. 4.

In the embodiment of FIG. 7, propagation of the vibrations from the second region B and the third region C to the vibration plate 104 is the same as in the previous embodiment described with reference to FIG. 5. Similar to the embodiment of FIG. 4, in the second region B, the vibration due to the vibration mode B propagates to the vibration plate 104, and in the third region C, the vibration due to the vibration mode C propagates to the vibration plate 104. Also, similar to the embodiment of FIG. 4, the vibration due to the vibration mode B and the vibration due to the vibration mode C are combined at each position on a top surface of the vibration plate 104, so that a vibration of the vibration plate 104 is generated. Thus, similar to the embodiment of FIG. 4, a frequency is selected so that an amplitude at each of the amplitude obtaining points is equal to or greater than a predetermined value in both of the vibration mode B and the vibration mode C, and if necessary, a position or a length of the block region D is adjusted, so that a vibration is sufficiently generated across substantially an entire region of the vibration plate 104. Accordingly, dust stuck to the surface of the vibration plate 104 may be effectively removed.

According to the embodiment of FIG. 7, the vibration partitioning unit is implemented by forming the block region D in the vibration generating unit 114 and by not arranging the first electrode 115c in the block region D, so that the vibration of the vibration generating unit 114 may be divided and then delivered. By doing so, a plurality of vibration modes may be generated in the vibration generating unit 114 using one input or driving frequency. In addition, a frequency may be selected so that the amplitude at each of the amplitude obtaining points set in the vibration plate 104 is equal to or greater than the predetermined value that is necessary for removal of dust, and thus, dust substantially anywhere on the entire region of the vibration plate 104 may be effectively removed.

Figure 9:
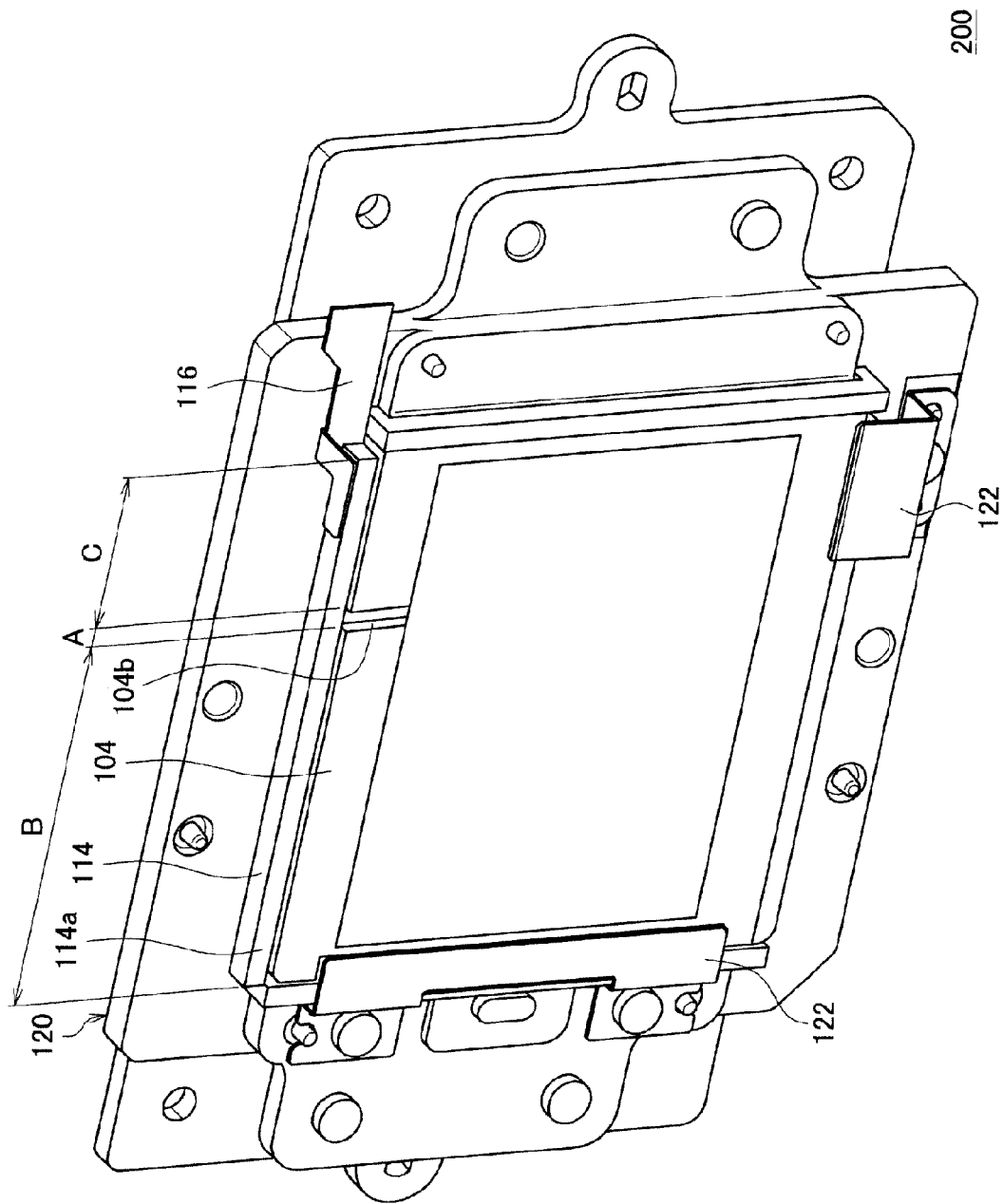
FIG. 9 is a perspective view of an imaging device unit mounted in an image-capturing apparatus, according to another embodiment of the invention.

FIG. 9 is a perspective view of an imaging device unit 200 mounted in an image-capturing apparatus according to another embodiment of the invention.

The imaging device unit 200 according to the present embodiment is similar to the imaging device unit 200 according to the embodiment of FIG. 4, but a configuration of a vibration partitioning unit of the imaging device unit 200 according to the present embodiment is changed. A vibration generating unit 114 is mounted on an upper end of a vibration plate 104 (according to the orientation illustrated in FIG. 9). The vibration partitioning unit is implemented by a cut part 104b that is formed by cutting or removing a portion of the vibration plate 104 that contacts the vibration generating unit 114. For example, the cut part 104b is arranged near a central region of a surface of the vibration plate 104 to which the vibration generating unit 114 is adhered.

By implementing the vibration partitioning unit by forming the cut part 104b, a vibration of the vibration generating unit 114 is not directly delivered to a first region A that is arranged on the surface of the vibration plate 104 corresponding to the cut part 104b, so that the vibration is suppressed, compared to a second region B and a third region C that are arranged on the surface of the vibration plate 104. Because the vibration of the vibration generating unit 114 is divided due to the cut part 104b and then is delivered to the vibration plate 104, two different vibration modes are generated in both sides of the vibration plate 104 with respect to the first region A in which the cut part 104b is formed.

Figure 10:
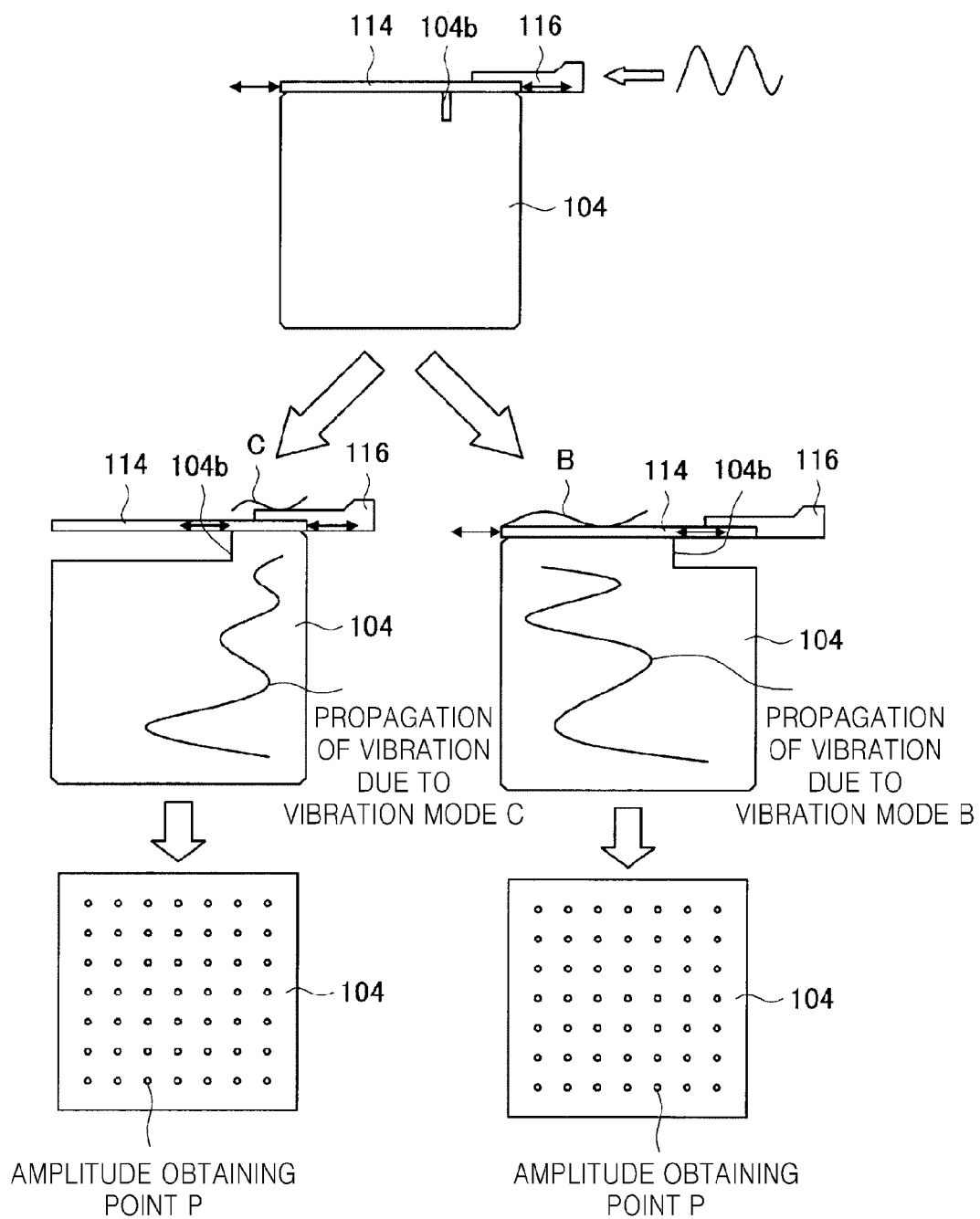
FIG. 10 is a diagram describing vibration modes in which vibrations generated in the second region and the third region of the vibration generating unit of FIG. 9 propagate to the vibration plate.

FIG. 10 is a diagram describing vibration modes in which vibrations generated in the second region B and the third region C of the vibration generating unit 114 of FIG. 9 propagate to the vibration plate 104.

As illustrated in a middle part of FIG. 10, a vibration is suppressed in the first region A where the cut part 104b is removed, and vibrations having different vibration modes propagate from the second region B and the third region C, respectively. Here, the vibration mode of the second region B is referred to as a vibration mode B, and the vibration mode of the third region C is referred to as a vibration mode C. Thus, although one frequency is input to the vibration generating unit 114, it is possible to obtain an effect as if the vibration generating unit 114 vibrated due to two different driving frequencies.

As illustrated in FIG. 10, the cut part 104b may be formed at a position that deviates from a center line of the vibration plate 104. When the position of the cut part 104b approaches an end of the vibration generating unit 114, the amplitude of a vibration in one of the vibration mode B and the vibration mode C may decrease. However, when the cut part 104b is disposed at a region adjacent to or near the center line of the vibration plate 104, amplitudes due to the vibration mode B and the vibration mode C may increase together. However, because the amplitude at each of the amplitude obtaining points varies according to an input frequency, an optimal position for the cut part 104b may be selected by performing the method described above with reference to FIGS. 6A and 6B.

Figure 11:
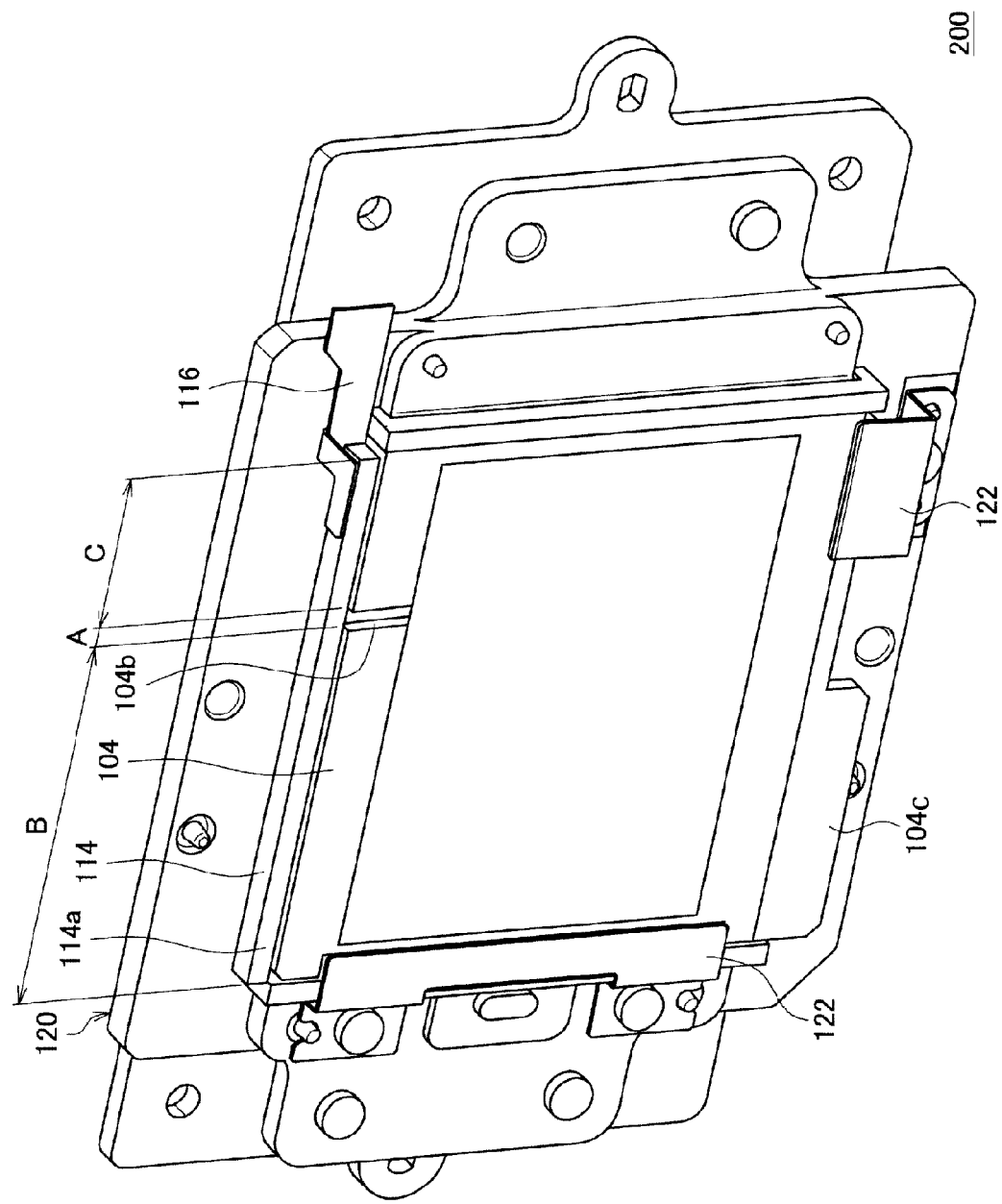
FIG. 11 is a perspective view of an imaging device unit mounted in an image-capturing apparatus, according to another embodiment of the invention.

FIG. 11 is a perspective view of an imaging device unit mounted in an image-capturing apparatus according to another embodiment of the invention.

Compared to the vibration plate 104 of the embodiment of FIG. 9, the present embodiment further includes an asymmetrical shape part 104b.

As illustrated in FIG. 11, the asymmetrical shape part 104c extending downward is mounted on a lower portion of a vibration plate 104. As described above with reference to the embodiment of FIG. 9, because a cut part 104b is arranged in the vibration plate 104, a vibration of the vibration plate 104 may be divided and delivered, so that a plurality of vibration modes may be generated in response to one input frequency. Also, because the asymmetrical shape part 104c is arranged on the vibration plate 104, the vibration divided by the cut part 140b may be asymmetrically and intensively delivered to the vibration plate 104.

The asymmetrical shape part 104c may be arranged so as to allow the vibration plate 104 to be asymmetrical in an extension direction of the vibration generating unit 114 and with respect to the position of the cut part 104b. By doing so, a difference between the vibration mode B and the vibration mode C may be further increased.

By forming the cut part 104b together with the asymmetrical shape part 104c, vibrations due to the different vibration modes B and C are generated at a random point of the vibration plate 104, so that generation of nodes in the vibrations may be effectively prevented.

Figure 12:
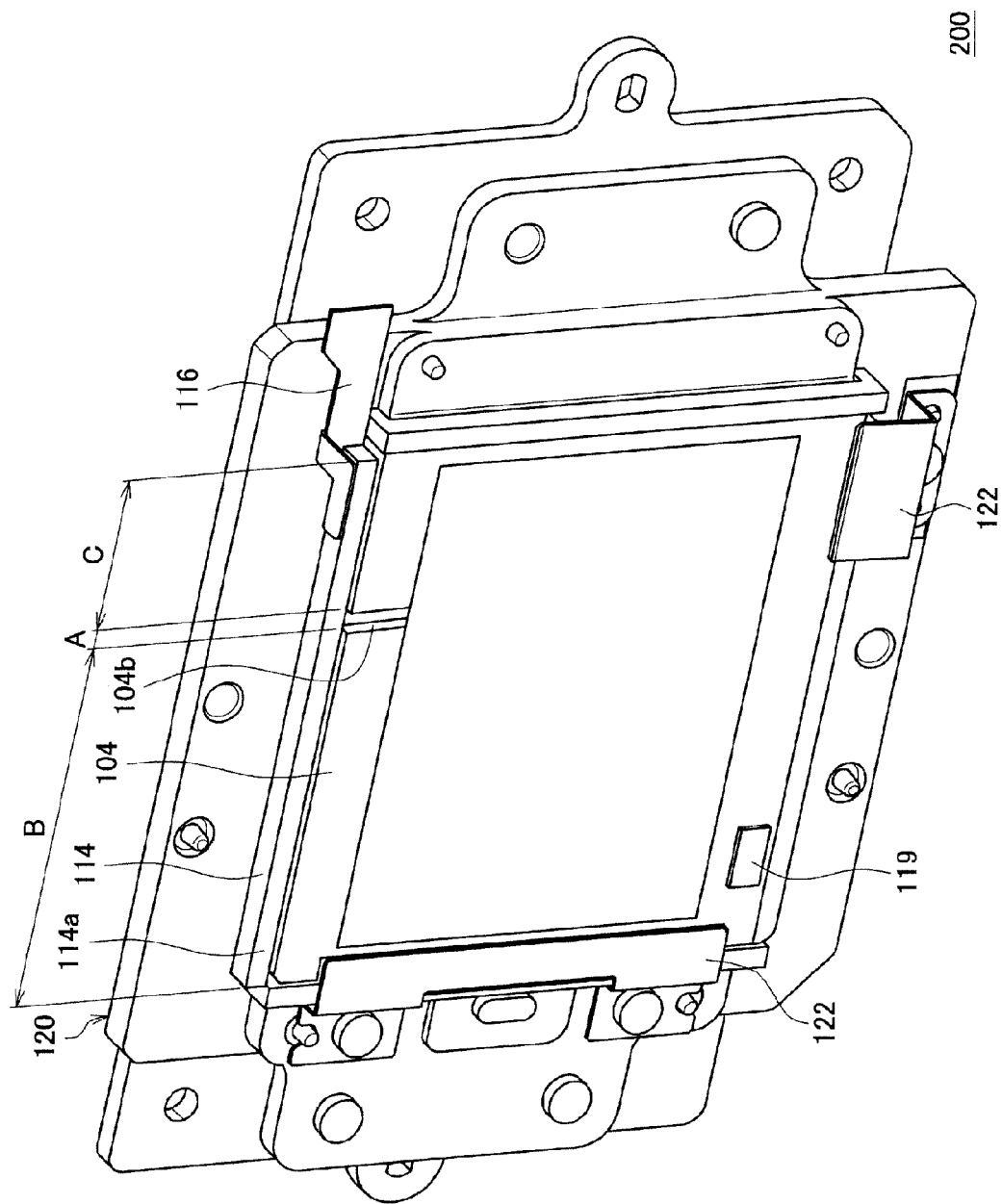
FIG. 12 is a perspective view of an imaging device unit mounted in an image-capturing apparatus, according to another embodiment of the invention.

FIG. 12 is a perspective view of an imaging device unit mounted in an image-capturing apparatus according to another embodiment of the invention.

The present embodiment is characterized in that a vibration suppression plate 119 is adhered to a lower portion of a vibration plate 104, instead of arranging an asymmetrical shape part 104c. As described with reference to the vibration suppression plate 119 of FIG. 4, the vibration suppression plate 119 may be formed of a material having an anti-vibration characteristic in contrast to the vibration plate 104.

According to the embodiments of FIGS. 11 and 12, in addition to the configuration of the vibration plate 104 according to the embodiment of FIG. 4, the asymmetrical shape part 140c is further arranged on the vibration plate 104, or the vibration suppression plate 119 is adhered to the vibration plate 104, so that a vibration generated by the vibration generating unit 114 may be asymmetrically propagated. By doing so, a plurality of vibration modes may be generated using one input or driving frequency, so that dust may be effectively removed across substantially an entire surface of the vibration plate 104.

When dust is removed by vibrating the vibration plate, the image-capturing apparatus according to the one or more embodiments may effectively remove dust using a simple configuration to prevent a position of a vibration node from being fixed.

The embodiments described herein may comprise a memory for storing program data, a processor for executing the program data, a permanent storage such as a disk drive, a communications port for handling communications with external devices, and user interface devices, including a display, keys, etc. When software modules are involved, these software modules may be stored as program instructions or computer-readable codes, which are executable by the processor, on a non-transitory or tangible computer-readable media such as read-only memory (ROM), random-access memory (RAM), a compact disc (CD), a digital versatile disc (DVD), magnetic tapes, floppy disks, optical data storage devices, an electronic storage media (e.g., an integrated circuit (IC), an electronically erasable programmable read-only memory (EEPROM), and/or a flash memory), a quantum storage device, a cache, and/or any other storage media in which information may be stored for any duration (e.g., for extended time periods, permanently, brief instances, for temporarily buffering, and/or for caching of the information). The computer-readable recording medium can also be distributed over network-coupled computer systems (e.g., a network-attached storage device, a server-based storage device, and/or a shared network storage device) so that the computer-readable code may be stored and executed in a distributed fashion. This media can be read by the computer, stored in the memory, and executed by the processor. As used herein, a computer-readable storage medium excludes any computer-readable media on which signals may be propagated. However, a computer-readable storage medium may include internal signal traces and/or internal signal paths carrying electrical signals therein Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as" or "for example") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. An image-capturing apparatus comprising:
    an imaging device to convert light into an electrical signal;
    a vibration plate disposed in front of the imaging device to transmit the light to the imaging device;
    a vibration generating unit mounted on the vibration plate to generate a vibration when a driving signal is input to the vibration generating unit; and
    a vibration partitioning unit mounted at a location asymmetrically offset from a symmetry line on at least one of the vibration plate or the vibration generating unit so as to divide an edge of the vibration plate or vibration generating unit into first and second sides such that vibrations imparted to the first side generate a first vibrational mode and vibrations imparted to the second side generate a second vibrational mode in the vibration plate, wherein displacements associated with the first and second vibrational modes overlap so as to remove nodes from the resulting vibration of the vibration plate.

2. The image-capturing apparatus of claim 1, wherein the driving signal input to the vibration generating unit consists of only one frequency.

3. The image-capturing apparatus of claim 1, wherein the vibration generating unit is mounted on an end of the vibration plate, and the vibration partitioning unit comprises a vibration suppression plate connected to the vibration generating unit, positioned at a position deviating from a center line passing through a central portion of the vibration plate, and is to suppress the vibration of the vibration generating unit.

4. An image-capturing apparatus comprising:
    an imaging device to convert light into an electrical signal;
    a vibration plate disposed in front of the imaging device to transmit the light to the imaging device;
    a vibration generating unit mounted on the vibration plate to generate a vibration when a driving signal is input to the vibration generating unit; and
    a vibration partitioning unit mounted on at least one of the vibration plate or the vibration generating unit to asymmetrically deliver the generated vibration to the vibration plate;
    wherein:
        the vibration generating unit is mounted on an end of the vibration plate;
        the vibration partitioning unit comprises a vibration suppression plate connected to the vibration generating unit, positioned at a position deviating from a center line passing through a central portion of the vibration plate, and suppresses the vibration of the vibration generating unit; and one end of the vibration suppression plate is connected to the vibration generating unit and the other end of the vibration suppression plate is connected to the vibration plate.

5. The image-capturing apparatus of claim 1, wherein the vibration generating unit comprises a piezoelectric device, and a first electrode and a second electrode that are disposed to face each other at opposite sides of the piezoelectric device and apply the driving signal to the piezoelectric device, and the vibration partitioning unit is a region that does not vibrate the piezoelectric device so that a portion of the first electrode is arranged to deviate from a position facing the second electrode.

6. The image-capturing apparatus of claim 1, wherein the vibration generating unit is mounted on an end of the vibration plate, and the vibration partitioning unit comprises a cut part formed by removing a portion of the vibration plate contacting the vibration generating unit.

7. The image-capturing apparatus of claim 6, wherein the cut part is formed at a position deviating from a center line passing through a central portion of the vibration plate.

8. The image-capturing apparatus of claim 7, wherein the vibration plate has an asymmetrical shape with respect to the center line passing through the central portion of the vibration plate.

9. The image-capturing apparatus of claim 7, further comprising a vibration suppression plate disposed on the vibration plate at a position opposite the cut part with respect to the center line passing through the central portion of the vibration plate.

* * * * *